United States Patent [19]

Osterlund

[11] Patent Number: 4,775,969
[45] Date of Patent: Oct. 4, 1988

[54] OPTICAL DISK STORAGE FORMAT, METHOD AND APPARATUS FOR EMULATING A MAGNETIC TAPE DRIVE

[75] Inventor: Steven W. Osterlund, North Kingstown, R.I.

[73] Assignee: Aquidneck Systems International, Inc., North Kingstown, R.I.

[21] Appl. No.: 37,749

[22] Filed: Apr. 13, 1987

Related U.S. Application Data

[63] Continuation-in-part of Ser. No. 863,564, May 15, 1986, abandoned.

[51] Int. Cl.$^4$ .................. G11B 7/013; G06F 13/00
[52] U.S. Cl. ....................... 369/53; 369/32; 369/59; 369/100; 369/111; 360/48; 360/72.2; 364/200
[58] Field of Search .............. 360/32, 48, 72.1, 72.2; 369/32, 59, 30, 33, 100, 53, 111; 358/342; 364/200

[56] References Cited

U.S. PATENT DOCUMENTS

| | | | |
|---|---|---|---|
| 3,400,371 | 9/1968 | Amdahl et al. | 364/200 |
| 3,400,372 | 9/1968 | Beausoleil et al. | 364/200 |
| 3,629,860 | 12/1971 | Capozzi | 364/200 |
| 4,001,883 | 1/1977 | Strout et al. | 360/48 |
| 4,089,027 | 5/1978 | Grigoletti | 360/72.2 |
| 4,229,808 | 10/1980 | Hui | 360/48 |
| 4,310,883 | 1/1982 | Clifton et al. | 364/200 |
| 4,321,635 | 3/1982 | Tsuyuguchi | 360/72.2 |
| 4,398,227 | 8/1983 | Anderson | 360/71 |
| 4,467,421 | 8/1984 | White | 364/200 |
| 4,486,870 | 12/1984 | Pettigrew et al. | 369/111 |
| 4,496,997 | 1/1985 | Ohtsuki | 360/32 |
| 4,531,166 | 7/1985 | Anderson | 360/73 |
| 4,541,019 | 9/1985 | Precourt | 360/48 |
| 4,545,044 | 10/1985 | Satoh et al. | 369/32 |
| 4,562,577 | 12/1985 | Glover et al. | 369/59 |
| 4,587,643 | 5/1986 | Monen et al. | 369/32 |
| 4,680,653 | 7/1987 | Ng et al. | 360/72.2 |
| 4,682,318 | 7/1987 | Busby | 369/59 |

OTHER PUBLICATIONS

Meng, "Optical Disks Slip on Compatibility", *Digital Design*, Jan. 1986, pp. 28,29,32,34,36 & 37.
Tucker, "Mass Storage Goes Optical", *Advanced Imaging*, Nov. 1986, pp. A19-A24.
Mitchell, Jr.; "Diskettete Load/Dump Control", IBM Tech. Disc. Bul., vol. 20, No. 4, Sep. 1977, pp. 1359-1361.
Fujitani, "Laser Optical Disk: The Coming Revolution in On-Line Storage", Communications of the ACM, Jun. 1984, pp. 546-554.
Warren, "Software Tools, Utilities Drive Optical Disks", *Mini-Micro Systems*, Dec. 1986, pp. 33,34,37,40,43 & 44.
Rothchild, "Optical Storage Moves Closer to Mainframes", *Computerworld*, May 7, 1984.
Rothchild, "CD-ROM and Write-Once Optical Storage-Right Now!", *Optical Memory News*, Jul.-Aug. 1985.
Jaworski, "Lasers Anticipate Mass (Storage) Appeal", *Hardcopy Magazine*, Feb. 1986, pp. 43-49.
Freeman Jr., "Optical Recording Comes of Age", *Mini-Micro Systems*, Apr. 1985, pp. 65,66 & 69.
Warren, "Optical Storage Shines on the Horizon", *Mini-Micro Systems*, Dec. 1985, pp. 68-70,73,74,75,76,79 & 80.
Welch, "A New Stab at Data Storage", *Venture*, Feb. 1986, pp. 66,68 & 70.

*Primary Examiner*—Donald McElheny, Jr.
*Attorney, Agent, or Firm*—Pennie & Edmonds

[57] ABSTRACT

An Optical Disk Storage system and method for the storage of magnetic tape records including an optical disk and a system for writing variable-length records to the disk with a plurality of embedded directories in close proximity to a plurality of records associated therewith. A high-level directory is constructed providing a list of addresses for the embedded directories. The embedded directories comprise a fixed maximum number of entries each indicating the length of a corresponding record. In a read operation, the high-level directory is accessed first to provide addresses for the embedded directories, with reference to positional information permanently written to the disk. Bytes of data are then counted in accordance with the stored record length information to access a record of interest. In this way, varying-length records can be efficiently stored on an optical disk divided into fixed-length data blocks.

21 Claims, 8 Drawing Sheets

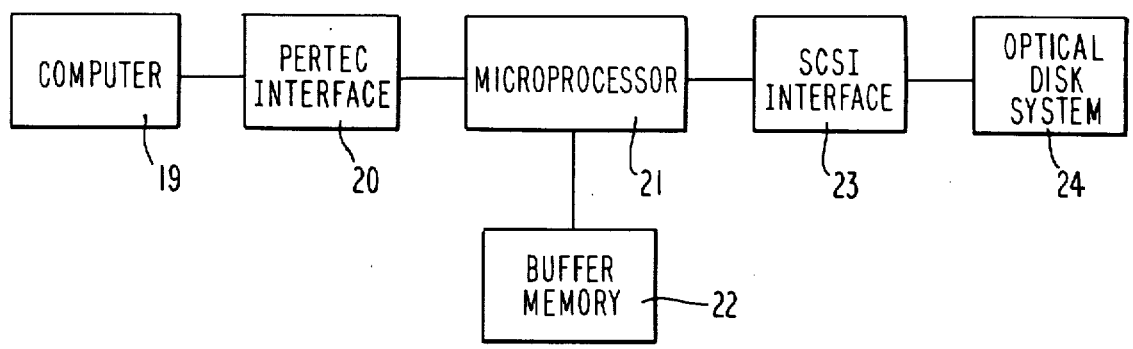
_Fig. 1_
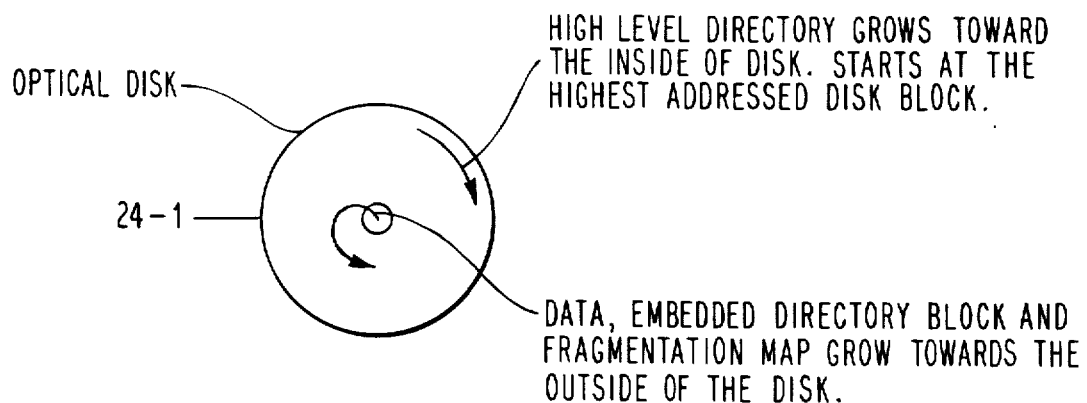
_Fig. 2_

FRAGMENTATION BLOCK
(ONLY PRESENT IF NUMBER OF FRAGMENTATION ENTRIES FIELD
IN PRECEDING EMBEDDED DIRECTORY IS NON-ZERO)

A BLOCK ON DISK EQUALS AT LEAST 1024 BYTES
OF 8 BITS EACH

NOTE: SEQUENCES OF BLOCKS THAT ARE LONGER THAN $FFFF_{HEX}$ CAN BE EXPRESSED BY CONTINUING THE COUNT AN ADDITIONAL ENTRY AND PUTTING A ZERO IN THE COMPLEMENTARY FIELD OF THAT ENTRY

OPTICAL DISK STORAGE FORMAT, METHOD AND APPARATUS FOR EMULATING A MAGNETIC TAPE DRIVE

PRIOR APPLICATION

This is a continuation-in-part of U.S. patent application Ser. No. 863,564, filed May 15, 1986, abandoned.

BACKGROUND OF THE INVENTION

This invention is directed to Optical Disk Storage systems and is more particularly directed to a new and improved embedded directory technique for storing data on an optical disk to permit rapid access thereto.

For general information concerning the field of optical data storage and the associated hardware, reference may be had to the following articles:

(1) May 7, 1984 edition, *Computerworld*, article entitled "Optical Storage Moves Closer to Mainframes";

(2) April, 1985 edition, *Mini Micro Systems*, article entitled "Optical Recording Comes of Age"; and (3) December, 1985 edition, *Mini Micro Systems*, article entitled "Optical Storage Shines on the Horizon".

One object of this invention is to efficiently solve the specific problems associated with using an optical disk storage system to emulate a magnetic tape storage system in a "plug-compatible" manner. Numerous problems are encountered in such an effort, due both to the differing natures of the media and to the data organization practices which have become customary in tape storage applications.

More particularly, as conventionally implemented, a single reel of magnetic tape is commonly used to store a single "file" of data, that is, an entire data set pertaining to a particular subject, e.g., a payroll file, an employee file or the like. Within each file, the data is typically divided into "records", the length of which is not fixed. For example, each record may relate to a particular employee. Normally each record in the file is set off on the tape by "preamble" and "postamble" indicators of specified format; successive records are separated by "inter-record" gaps.

In some cases, a single reel of tape may store several files, that is, several data sets accessed separately by an application program running on a host computer. If plural files are stored on a single tape, they may be divided by "file marks", as discussed below; however, the presence of a file mark does *not* indicate the end of a file per se. For the purposes of the present invention, it is immaterial whether one or several files are stored on a single reel of tape.

Typically, data is written to the tape record-by-record under direct control of a host computer. When the host subsequently desires to retrieve one of the records, it first directs that a particular tape be mounted, that is, so that the single file typically found on each reel of tape can be accessed. The host then directs the tape drive to obtain access to the "next" record. In response to such a command, the tape drive will typically read the next record into a random-access memory or other buffer for subsequently supplying it to the host; less sophisticated drives may simply advance the tape to a point corresponding to the beginning of the next record. If the host is not interested in a particular record, it directs instead that the next record be accessed, and so on. Thus, if the host in fact needs access to the two hundredth record on the tape, 200 such "next record" instructions must be forwarded from the host to the tape drive and executed. Obviously, this is very time consuming. Normally, of course, the intrinsic sequential nature of tape storage is turned to advantage by use of tape in connection with programs (e.g. payroll processing) in which the records can conveniently be accessed in sequence, one by one.

In order to partially alleviate this problem, it is conventional for the host computer to direct that a so called "file mark", consisting of a predetermined sequence of bits, be written to the tape from time to time, that is, at unspecified intervals between records. If the host desires to skip over a portion of the tape, it can then direct that the tape be advanced to the next file mark. The drive can advance the tape until it detects the unique file mark sequence. If the host "knows" that the record of interest is between the second and third file marks, for example, it can direct that the tape advance to the first file mark, and when this has been done, to the second file mark; the host can then direct that the tape successively read individual records, as above. Again, this process is relatively cumbersome and time consuming.

As indicated above, one object of this invention is the emulation of a tape drive using optical disk storage media. It is important that the optical disk according to the invention be "plug-compatible" with a tape drive; that is, the optical drive according to the invention must be connected to a host computer precisely as is a conventional tape drive. In this way, the optical disk can be employed without requiring any modification to the host operation or application software. Clearly, in order to do so the optical drive must respond to all of the commands which are conventionally directed to tape drives, as outlined above, and in order to be attractive to users must provide a substantial performance advantage.

At present, all optical disk media of which the present inventor is aware define a single spiral "track". Radially-extending "hard sectors", provided at manufacture, are spaced circumferentially around the disc and divide the spiral track into "sectors". Typically 1,024 bytes per sector may be stored. The optical drive is provided with a controller operable so that its read/write head can access the disk at the beginning of any sector; hence reading and writing operations can begin at a number of "sector locations" equal to the number of the hard sectors on the disk (on the order of 32) times the number of the essentially concentric rings (on the order of 32,000) made by the spiral track.

One way of writing varying-length tape-type records to an optical disk would be to start each individual record at a sector location. In that way, whenever the host directed that the next record be accessed, the optical disk could simply begin reading at the subsequent sector. However, many tape record entries are very short, e.g., a single byte may be written as a record. In such cases, essentially the entire storage capacity represented by the sector would be wasted.

It will be recognized, of course, that magnetic disk storage is also extremely popular. Magnetic disks are also typically divided into sectors, but use concentric rather then spiral tracks. It might be considered that magnetic disk storage techniques could be usefully applied to optical disk storage. However, this actually is not the case due to the varying characteristics of magnetic and optical storage systems, for the following reasons.

Conventionally, for a disk of given size, an optical disk can store up to ten times as much data as can a magnetic disk. However, a magnetic disk can be repetitively erased and rerecorded, such that if the contents of a given file change over time, the obsolete data is simply erased and rewritten. This cannot be done with conventional optical disks, which do not allow erasure. Erasing of obsolete blocks of data, incidentally, is typically not practiced on tape, although erasing itself is readily accomplished. Instead, the new data is simply written to the end of the tape and a record is maintained (e.g. by the application program) of which data blocks are current and which are obsolete, such that those which are obsolete are simply ignored. This is preferred because the time consumed in rewinding the tape to the location of the obsolete record—record-by-record, as discussed—is more costly than simply using a new section of tape.

Another important distinction between optical and magnetic disk storage is that the average "head seek" time required by state of the art magnetic read/write heads to move radially in order to access various portions of the disk is much shorter than that of an optical disk. This is simply becaue the magnetic read/write head assembly of a magnetic disk is typically less massive than the laser read/write head associated with an optical disk. The magnetic read/write head assembly can therefore be moved much more quickly to a given area of the disk for a read/write operation than can an optical head. Accordingly, it is desired to provide a memory structure and organization for an optical disk in which head seeks are minimized insofar as possible.

The fact that magnetic disks allow repeated erasure of and rapid access to varying point of the disk has caused disk memory organization practices to develop substantially differently from those employed in connection with tape storage. As indicated above, on a given tape a single file comprising a number of individual "records" is normally stored, and a host computer accesses the file record-by-record, that is, sequentially. On a magnetic disk, by comparison, data is typically accessed only file-by-file. For example, the entire payroll file might be read from a disk into a host computer for processing in a single operation. Where a particular file extends beyond a particular sector (the beginning points of the sectors again being the only points at which the magnetic disk can accurately be addressed) a directory also stored on the magnetic disk provides a "map" according to which the read/write head can then "jump" from the end of that sector to the beginning of the sector at which the next portion of the file is stored. Typically, this can be accomplished sufficiently quickly that the host does not experience a delay in accessing all of the file. Accordingly, even if an application program does not require all of the data contained in an entire file stored on a magnetic disk, but only a portion thereof, which might or might not correspond to a "record" as stored on tape, it simply accesses the entire file from the disk and then selects the individual portion required therefrom when the data has been stored in the host.

The above discussion serves to illustrate why the storage organization arrangements used for magnetic tape and disk storage cannot appropriatey be applied to optical disk storage, even where a particular sequentially-organized data set to be stored on the optical disk might otherwise have been suitable for storage on tape. Notably, the fact that tape records are conventionally accessed record-by-record means that it would be inappropriate to assign an entire sector on the optical disk to each record; if the record were relatively short, most if not substantially all of the sector would be wasted. The variable-length tape records would rarely correspond to the fixed length of the sectors, such that incomplete usage would be very common.

More specifically, note that data is stored on tape record-by-record because there is no alternative to doing so; on tape, there are no permanently-written equivalents of the hard sectors on the disk which can be used to provide indexing to a particular record, for example. File marks can be written, as described above, but as presently employed this is done only in response to specific host commands. Accordingly tape records *must* be delimited by preamble and postamble information, so that they can be reliably counted.

Writing data to tape record-by-record does permit flexibility of record length. Media organized into blocks of fixed length, such as magnetic or optical disks, do not have this flexibility. Accordingly, to store tape-type records on media divided into fixed-length blocks (i.e., either optical or magnetic disks) is complex.

On the other hand, to organize an optical disk in the way in which magnetic disks are normally organized would be highly inappropriate. Data stored on magnetic disks is accessed file-by-file, with numerous "head seeks" between portions of the file stored in various sectors, as indicated. Such a scheme would be inefficient in an optical disk system due to the relatively slow motion of current optical read/write head assemblies. In effect, in such case the sequential nature of the spiral track on an optical disk would not be employed gainfully. Moreover, if an optical disk were to be configured to be plug-compatible with a magnetic disk, the fact that data stored on magnetic disks is frequently erased and overwritten would mean that numerous obsolete copies of large volumes of data would be stored on the optical disk, since no erasure is possible. This would rapidly fill up even the high capacity optical disk systems now available. Further, to emulate a magnetic disk to a host would involve numerous difficulties with respect to plug-compatibility.

It would of course be possible to provide an interface scheme for mating a computer with an optical disc drive in a manner designed to take advantage of the characteristics of the optical media. However, this would prevent the optical disc from being useful with preexisting computer systems, limiting the market for the optical disc.

Accordingly, it can be seen that a new way of recording data efficiently on an optical disk, while retaining plug-compatibility with a conventional magnetic data storage device, such as a tape drive, is needed.

BRIEF DESCRIPTION OF THIS INVENTION

This invention is directed to a new and improved method and apparatus for storing record data and record structure data (all of which is hereinafter sometimes referred to as information) on an optical disk. Optical disks as constructed today comprise concentric tracks or a spiral track in which physical changes, e.g., bubbles are formed by a laser writing head to record information. The information is read out for example by measuring reflected light from the tracks.

In the method and apparatus for storing data according to the invention, record structure information is separated from the data of the records and is distributed on the disk so that it is in close physical proximity to the optical disk read/write head when it is needed.

With this system and method, the optical disk is able to efficiently simulate magnetic tape storage. The method of the invention also enables the optical disk to be used efficiently for storage of data not particularly directed to magnetic storage devices.

According to the present invention, a high-level directory is begun during initial writing of data to an optical disk. The high-level directory relates a file to a number of "embedded directories" interspersed with the data on the disk, and written to the disk substantially simultaneously with the data. The "embedded directories" each provide an index to a number of associated data records, all part of a single corresponding file. The fact that the embedded directories are interspersed with the data reduces the number of long "head seeks" required to access a particular record. Preferably, the embedded directories are written to the disk immediately following the data records to which they correspond. The high-level directory is written to a predetermined location on the disk, so that it can be located reliably; entries are added to the high-level directory as data is written to the disk.

In order to allow emulation by the optical disk of the record-by-record response of a tape drive to typical host commands, the embedded directories each contain a sequence of record length identifiers. Each record length identifier simply consists of a number equal to the number of bytes of a corresponding record having been written to the optical disk by the host. The records themselves are written contiguously; that is, the preamble and postamble and interrecord gaps found on tape are eliminated, such that very high density of data storage on the disk is achieved.

In an exemplary embodiment each sector contains 1,024 bytes of data. Each embedded directory occupies one sector; header and other information required to identify each embedded directory takes the first 24 bytes of the sector. The remainder of the sector containing the embedded directory consists of record length data. Each record length data item is assigned two bytes in the embedded directory, such that each embedded directory is capable of containing 500 record length identifiers corresponding to 500 stored records.

The sector address of each of the embedded directories is stored in the high-level directory, and an identification of the file to which the records corresponding to each of the embedded directories belong is stored therewith. When a host subsequently requires access to a particular file, the optical disk storage control system accesses the high-level directory to determine the starting address of the first embedded directory corresponding to that file. When the host subsequently desires to read a particular record, the optical disk control system accesses the corresponding embedded directory—which *follows* the data to which it corresponds—to determine the number of bytes of data preceding the particular record sought, starting from the sector after the preceding embedded directory, and the number of bytes of the particular record sought. The starting point of the particular record sought can then be located simply by counting out a number of bytes of data corresponding to the total length of the preceding records. The specific record sought can then be supplied by counting out a number of bytes of the copied data equal to the length of the record sought.

As mentioned above, the host computer may also direct that file marks be written to the tape from time to time. According to the invention, file marks are written as zero-length records in the corresponding embedded directory. As noted, the locations of the embedded directories are stored in the high-level directory. When the host directs the tape to skip ahead to the next file mark, the entries in the embedded directories are reviewed. The zero-length entries in the embedded directory then indicate the location of the file marks.

A defective area on an optical disk is sometimes encountered. If this occurs, a "fragmentation map" is constructed which is stored in the sector immediately following the embedded directory. The map contains the lengths of the "good" and "bad" portions of the disk. This information is taken into account when counting data during the reading of the data back to the host, such that the existence of the bad data blocks need not be communicated to the host.

The use of the embedded directories containing the length of each record thus allows a particular record to be accessed simply by counting bytes of data on the disk as they are read. The data need not be examined, e.g., to determine whether a particular byte is preamble or postamble information or the like. The ultimate result is that data "segments", consisting in the presently-preferred embodiment of up to 500 records of any length desired, are stored in sequence, each associated with a single embedded directory. [In the exemplary embodiment, the maximum record length is 64k bytes—1, to conform to the largest record length value which can be stored as two bytes in the embedded directory.] The data is stored contiguously without wastage of space due to preamble or postamble requirements or to interrecord gaps. The only space wasted is that which may exist in a single sector between the last record corresponding to a particular embedded directory and the beginning of the next sector, in which the corresponding embedded directory is located.

The result is that random length data records may be stored efficiently on an optical disk device which is divided physically into sectors of fixed storage capacity.

Similarly, the length of a "file" is essentially unlimited by the present system, except that at minimum each file will require an embedded directory and at least one record. Accordingly, each file entry will consist of at least two sectors, one for the embedded directory and one for the at least one data record. The maximum length of a file is unlimited, as however many embedded directories are needed to list the lengths of its records may be written interspersed with the data, and may have their sector addresses recorded in the high-level directory.

More particularly, according to the preferred embodiment of the invention, the high-level directory is written starting from one end of the spiral track on the optical disk, and the data and embedded directories are written starting from the other; disk storage limitations are encountered only when the two intersect. In this way no fixed allocation of space between the high-level directory and the data need be made, and the allocation which ultimately occurs is the most efficient possible.

Before starting the transfer of tape records to optical disk, a high-level directory entry is constructed in microprocessor memory that contains the address of the next available block of the data portion of the disk surface available on data storage. Construction of a high-level directory for this purpose is generally conventional in optical disk systems. As data is written to the optical disk, record length and bad block information is added to the embedded directory that is also being constructed in memory. After, for example, 500 records have been transferred from magnetic tape, the embedded directory (and fragmentation block, if necessary) is written to the next good area on the disk. After being successfully written, the embedded directory address is appended to a table that is temporarily stored in a random access memory comprised by the disc controller. This process is repeated until the data transfer operation is completed. After all records have been written to disk, for example, when an operator-initiated "dismount" command is encountered, meaning that the file has been fully transferred, the high-level directory entry is written from microprocessor memory to the disk. The entry is written at the location adjacent to the location of the last high-level directory entry written to the disk.

All of the data which had been directed to tape by the host for storage is treated as a single file in the high-level directory structure. The appended table of embedded directory addresses can be used to locate any 500-record segment within the file. This serves as a convenient way to locate the embedded directory blocks; however, if this entry becomes damaged, the data itself can still be recovered using pointers in the embedded directory itself.

BRIEF DESCRIPTION OF DRAWINGS

FIG. 1 is a system block diagram including a computer connected for converting magnetic tape data from the computer to data to be placed on an optical disk;

FIG. 2 depicts the overall scheme of writing data to an optical disk according to the invention;

DETAILED DESCRIPTION OF THE INVENTION

Figure 3:
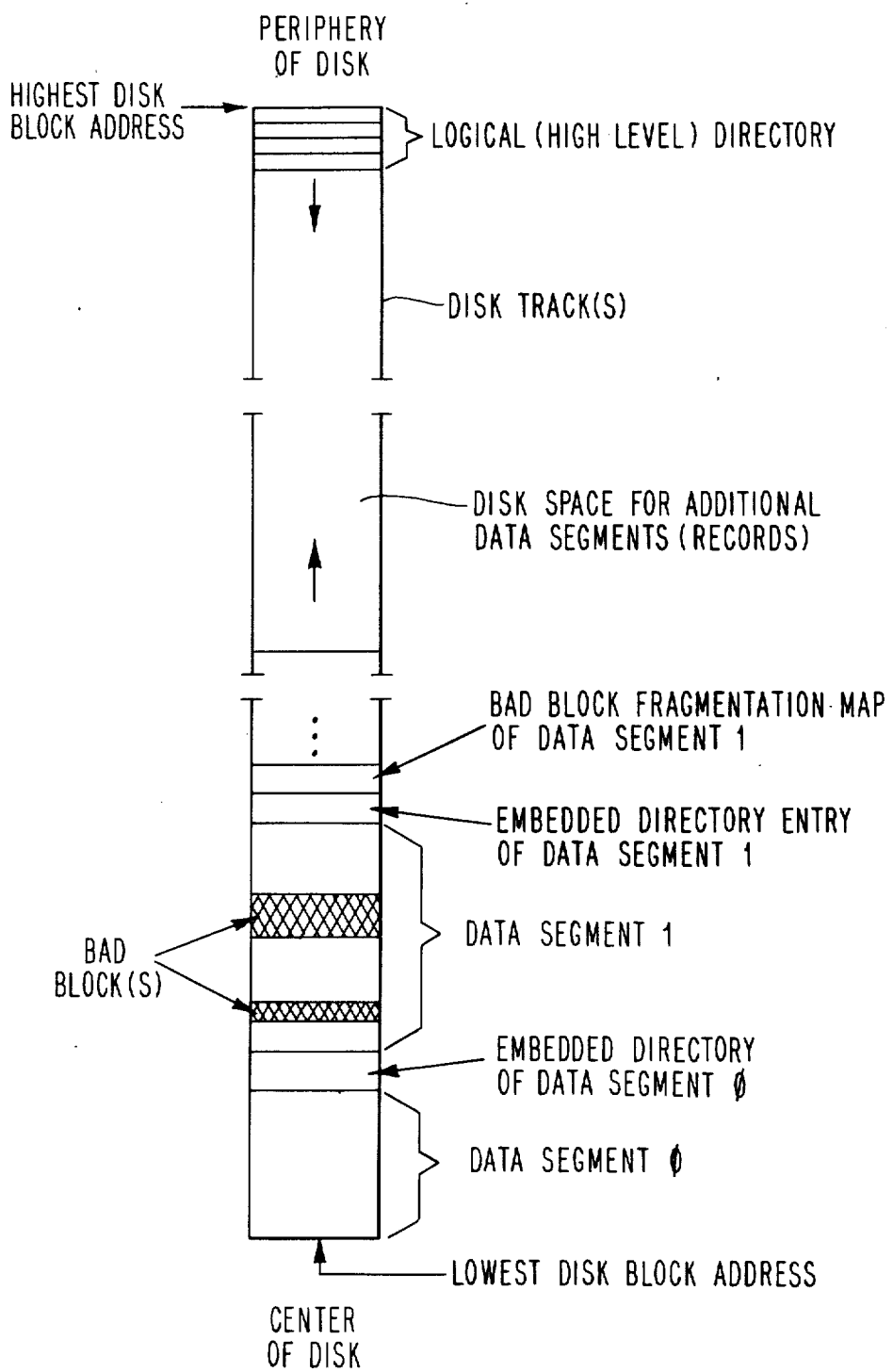
FIG. 3 depicts the physical layout of the data and directories as recorded on an optical disk.

Reference should now be had to FIG. 1 for an overview of the system. Computer 19 represents any computer, e.g., VAX 11/780 which provides an output for recording on various peripheral data storage devices. Such devices include magnetic tape drives, e.g., a 9 track drive whereby data is recorded on nine tracks of a tape. In this invention, the computer 19 is directed to supply conventional nine track magnetic tape data (tape image data), however according to the invention such data is written onto an optical disk rather than to a tape. In other words, communication between the optical disk and the computer 19 according to the invention is "plug compatible" with the communication between the computer 19 and a conventional tape drive. In order to accomplish this, an interface 20 complying with a standard tape drive interface specification such as a "Pertec" interface is provided. In particular, the interface 20 takes the signals to and from the computer 19 and a microprocessor 21 comprised by the optical disk control system of the invention and converts them to the Pertec standard. This is in fact the same technique used to permit computer to tape drive communications. Interface 20 may be constructed using conventional hardware or a combination of conventional hardware and software, and performs no role in the invention as described and claimed.

The microprocessor 21 coupled to the interface 20 is controlled by software which is to be described by reference to the flow charts appearing as FIGS. 6–9 hereof, and provides the following functions in accordance with this invention:

(1) Generates information for a high-level directory in microprocessor buffer memory consisting of disk addresses of embedded directory entries;

(2) Constructs in the buffer memory 22 embedded directory entries comprising record length information corresponding to the lengths of the records to be stored;

(3) Writes the record data and embedded directory entries to the optical disk 24-1; and (4) Writes a high-level directory entry from memory 22 on the optical disk 24-1 using the conventional laser read and write head electronics, along with the table of embedded directory disk addresses.

During reading operations the high-level directory entry is read from the optical disk 24-1 and used to determine the disk addresses of the embedded directory entries. The appropriate embedded directory entry is then used to locate the segment of the optical disk that contains desired record data.

The microprocessor 21 can be any suitable unit; for example, a Motorola model 68010 is suitable. For buffer memory 22, semiconductor memory purchased from Motorola is suitable; however other conventional memory may be used. The SCSI" interface 23 coupling the microprocessor 21 and optical disk 24 (SCSI is the international standard meaning "small computer systems interface") may be purchased from Applied Controlled Concepts Corporation, Milwaukee, Wis., as model AVME 1686 or from other vendors.

The optical disk drive for the disk 24-1 of system 24 may be one of many different types e.g., an OPT MEM 1000 purchased from OPTIMEM Corporation, Sunnyvale, Calif., which uses conventional optical disks for recording information.

FIG. 2 shows a typical optical disk 24-1 having information, i.e., record data and directory information stored thereon on one track (if spiral record is used) or more tracks if concentric tracks are used on the disk. As indicated, the high-level directory starts at the outermost edge of the disk and moves inwardly, while the data and embedded directories move outwardly. In this way no fixed allocation of space need be made.

FIG. 3 shows the layout of the entire spiral track, or of the concentric tracks, depending the storage technique used. It is understood that disks may store data from one or more tapes depending on tape length. Assuming that an amount of records corresponding to a single file which might have been stored on a single tape is to be recorded on a disk 24-1, FIG. 3 illustrates the typical data record locations and the corresponding directory positions, along with bad disk blocks (unusable disk portions) and bad disk block fragmentation maps pointing out where the bad disk blocks are located in the disk.

In particular, a data "segment" is written first, followed by its corresponding embedded directory entry. As noted, the embedded directory comprises a list of the length, in bytes, of the records stored corresponding thereto.

If bad disk block(s) are encountered during attempts to write the data segment to the disk, a bad disk block "fragmentation map" is generated and is recorded on the disk following the embedded directory entry.

This is repeated as more groups of records are added to the disk. At the end of the writing of each data segment, the sector address of the associated embedded directory block is added to a list in the high-level directory in buffer memory. When the disk recording session is completed, the corresponding high-level directory entry is written to the disk.

Figure 4:
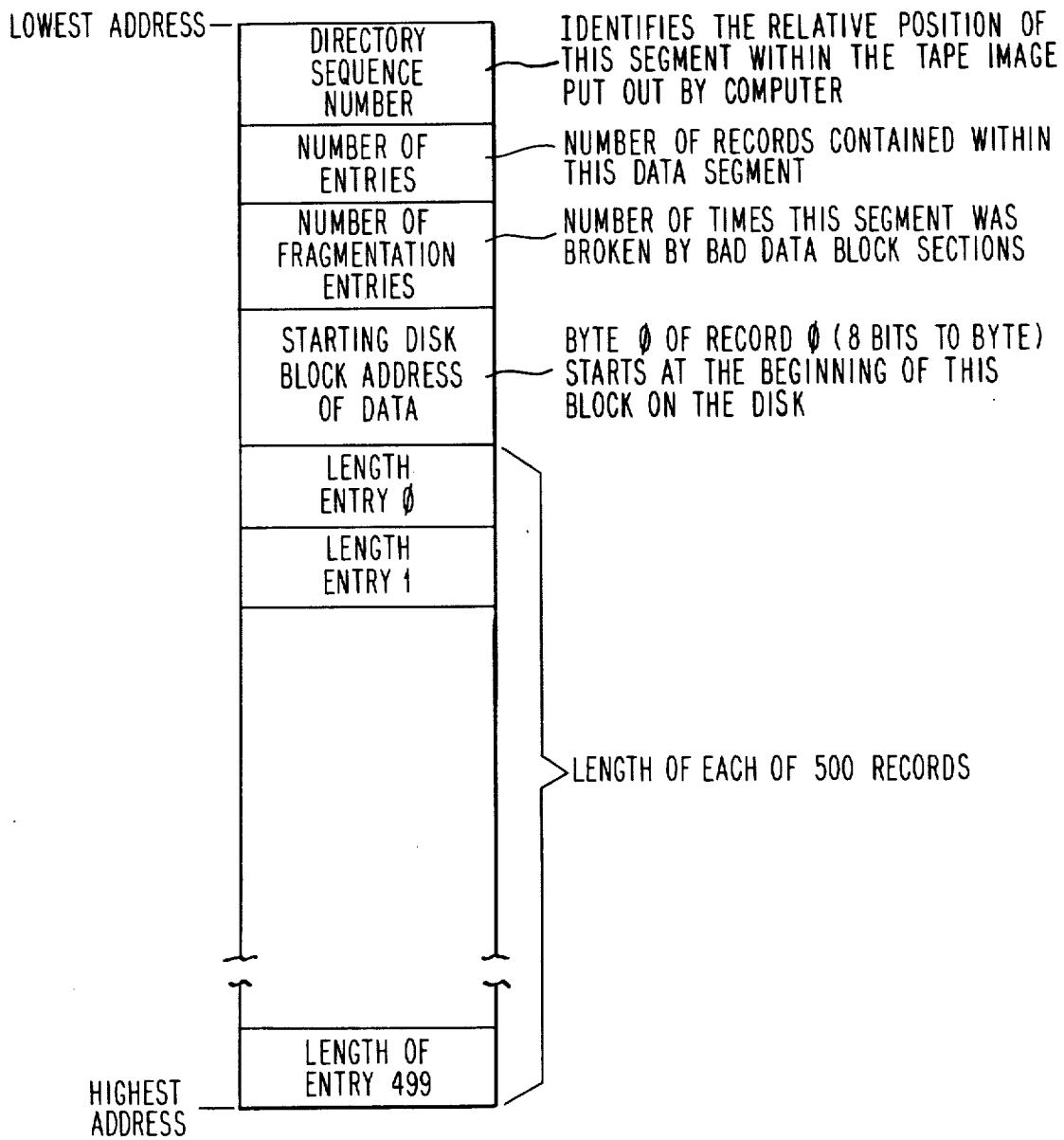
FIG. 4 depicts the physical layout of the information contained in an embedded directory on the track of an optical disk.

Referring to FIG. 4, the structure of each embedded directory block is shown. The first 24 bytes of each 1024-byte embedded directory comprise header information including the number of fragmentation (bad block) entries. The starting address of the first record is then recorded. This is followed by 500 2-byte entries, one per record, each comprising a number equal to the length of the corresponding record, that is, a number equal to the number of bytes of data making up each record. Record length information corresponding to 500 records can thus be stored in each 1024-byte embedded directory, occupying one complete sector.

Figure 5:
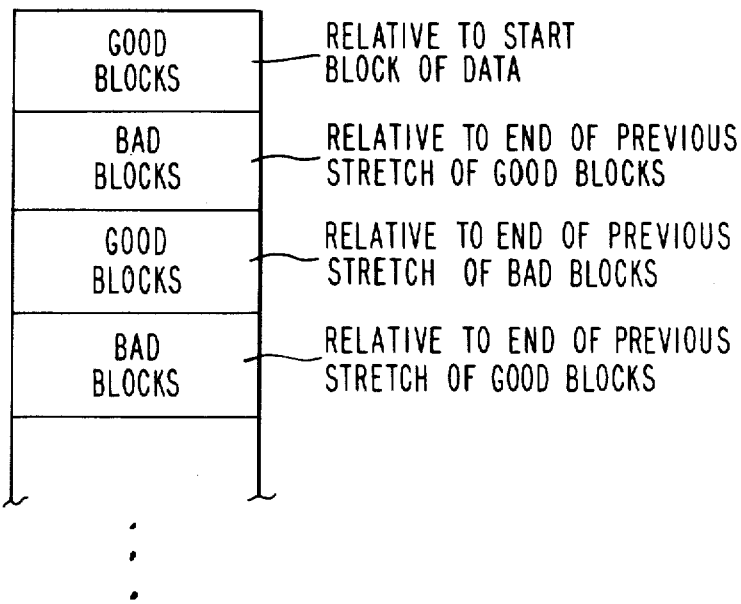
FIG. 5 depicts the physical layout of the information contained in a fragmentation block on a track of an optical disk.

Reference should now be had to FIG. 5 which illustrates the fragmentation map. The fragmentation map lists the sequence of good and bad blocks encountered in the preceding data segment. A bad block represents one or more sectors on the disk on which data was detected as having been incorrectly written. Such information is conventionally determined by the optical disk drive system 24 by first writing data and then immediately checking it for correctness. If the data recorded is incorrect, then the disk sector containing this data is considered a bad sector. The fragmentation block map permits one to read out the blocks of good data and disregard the bad blocks of data. In the preferred embodiment the minimum entry size in the fragmentation map is one sector, but this does not limit the invention.

Figure 6:
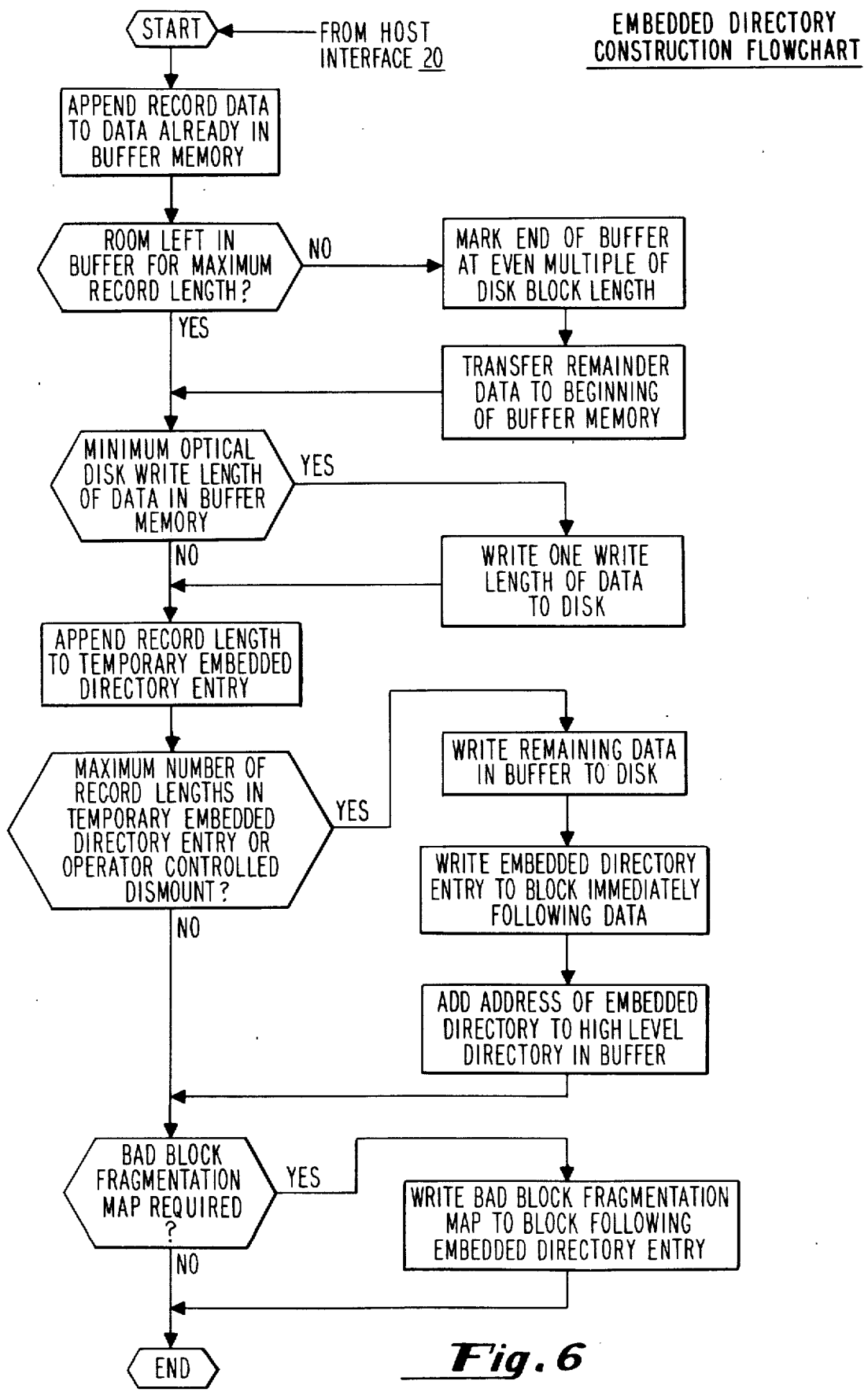
FIG. 6 depicts a flowchart of the software for constructing an embedded directory during a recording operation in which data is written to the optical disk.

FIG. 6 represents a flow chart for program coding to operate the microprocessor 21 to cause the data and generated embedded directories to be written on the disk. Record data is received from the Pertec interface 20 from the computer 19 to begin the recording procedure and generate the embedded directory as previously described. The embedded directory is written on the disk when the computer operator decides to dismount (stop recording data) or when 500 records have been written on the disk in the preferred embodiment of this invention. It should be understood that this number 500 is arbitrary and may be varied if desired depending on the use.

Figure 7:
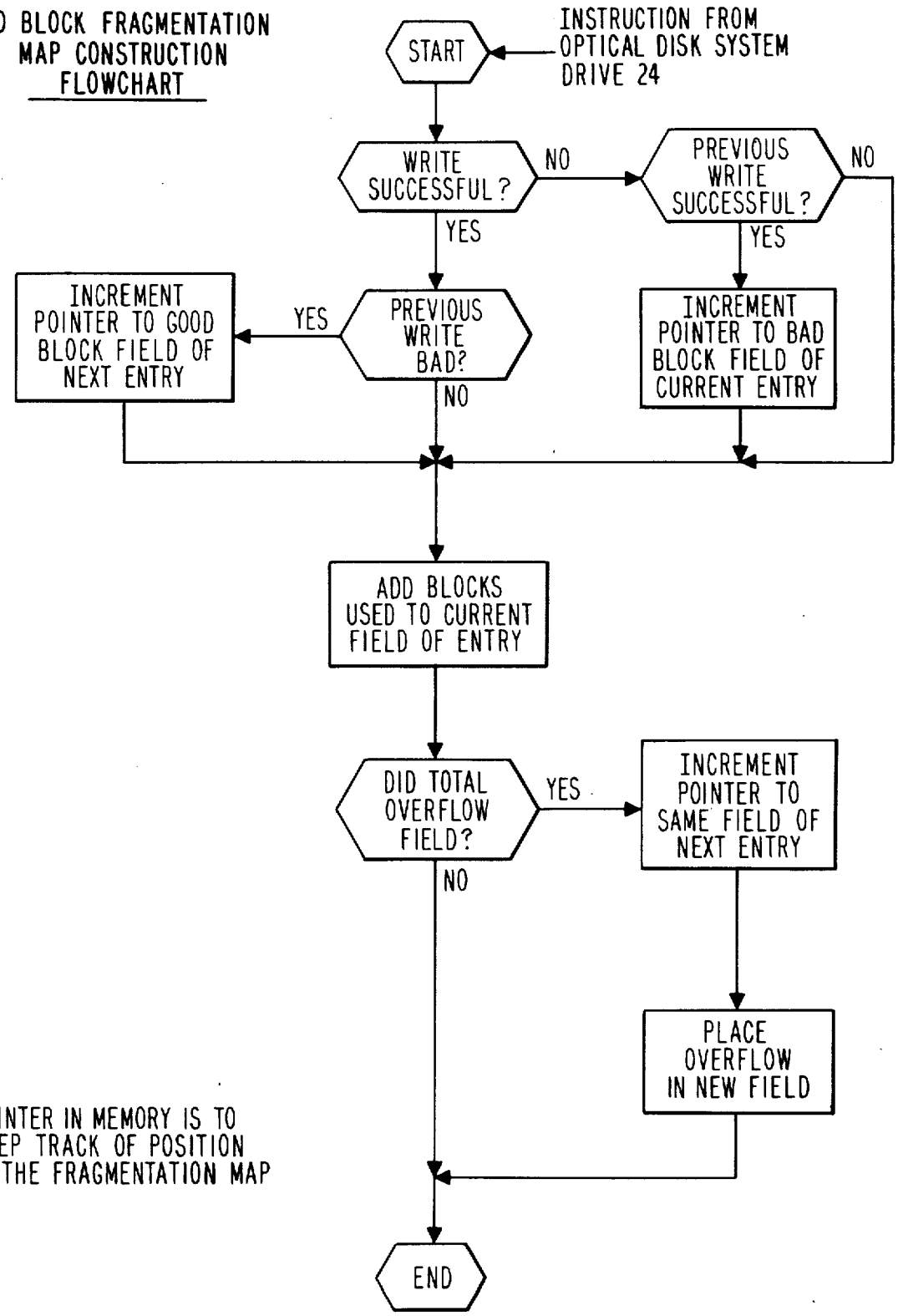
FIG. 7 depicts a flowchart of the software which constructs an embedded fragmentation map during the recording operation.

FIG. 7 represents a flow chart for program coding to generate the bad block fragmentation map. Bad blocks on the disk are determined when the recorded data is checked for correctness. If the data recorded on the optical disk is incorrect, then the disk block portion on which the data was recorded is considered a bad block.

Figure 8:
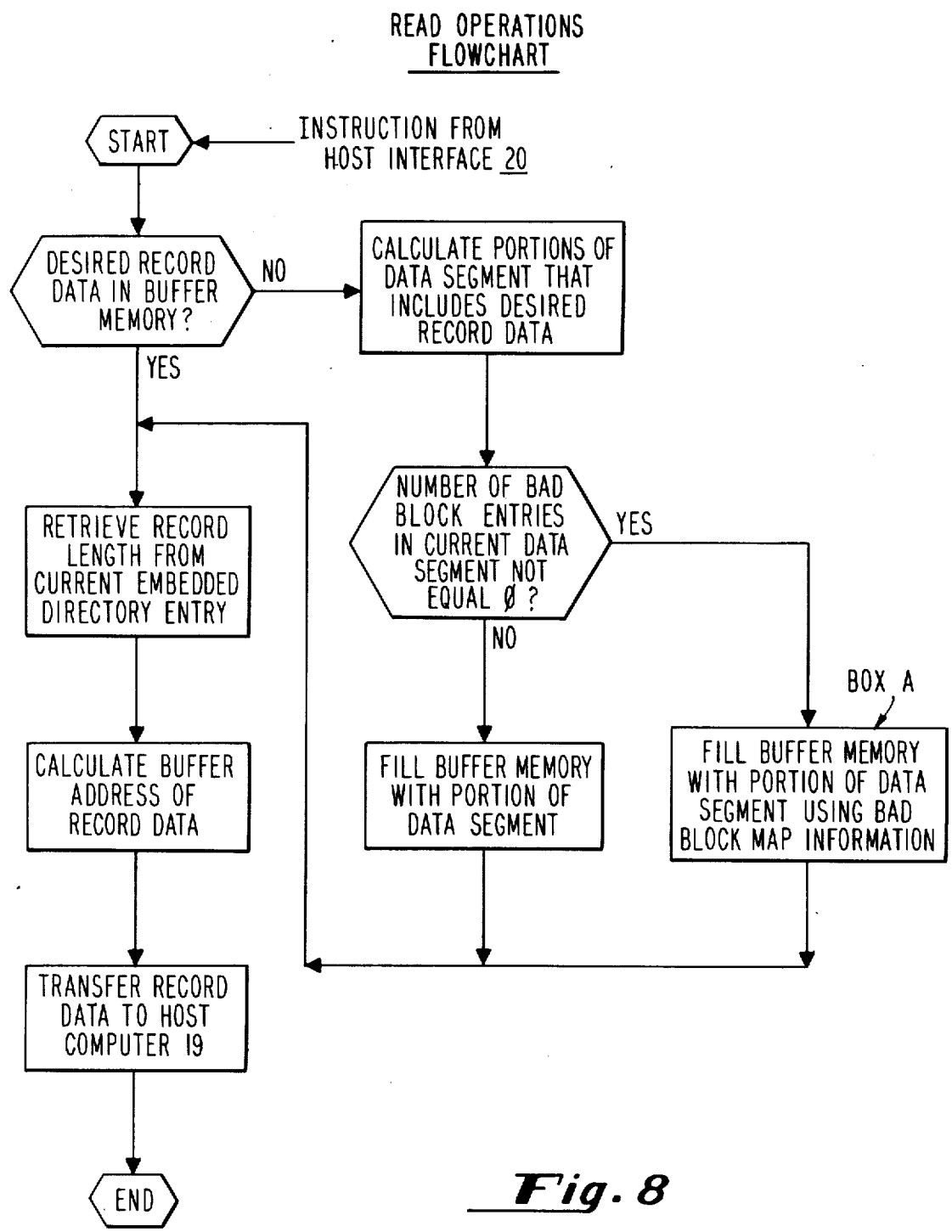
FIG. 8 depicts a flowchart of the software for reading data from the disk.

FIG. 8 represents a flow chart for reading out the record data recorded on the disk. Instructions to read out the disk come from the Pertec 20 interface via the computer 19. In essence, the flow chart represents how the records are read out (retrieved) by calculating from the high-level directory and embedded directories where the record data is stored on the disk and then reading out the record data while disregarding the bad blocks based on the fragmentation map.

Figure 9:
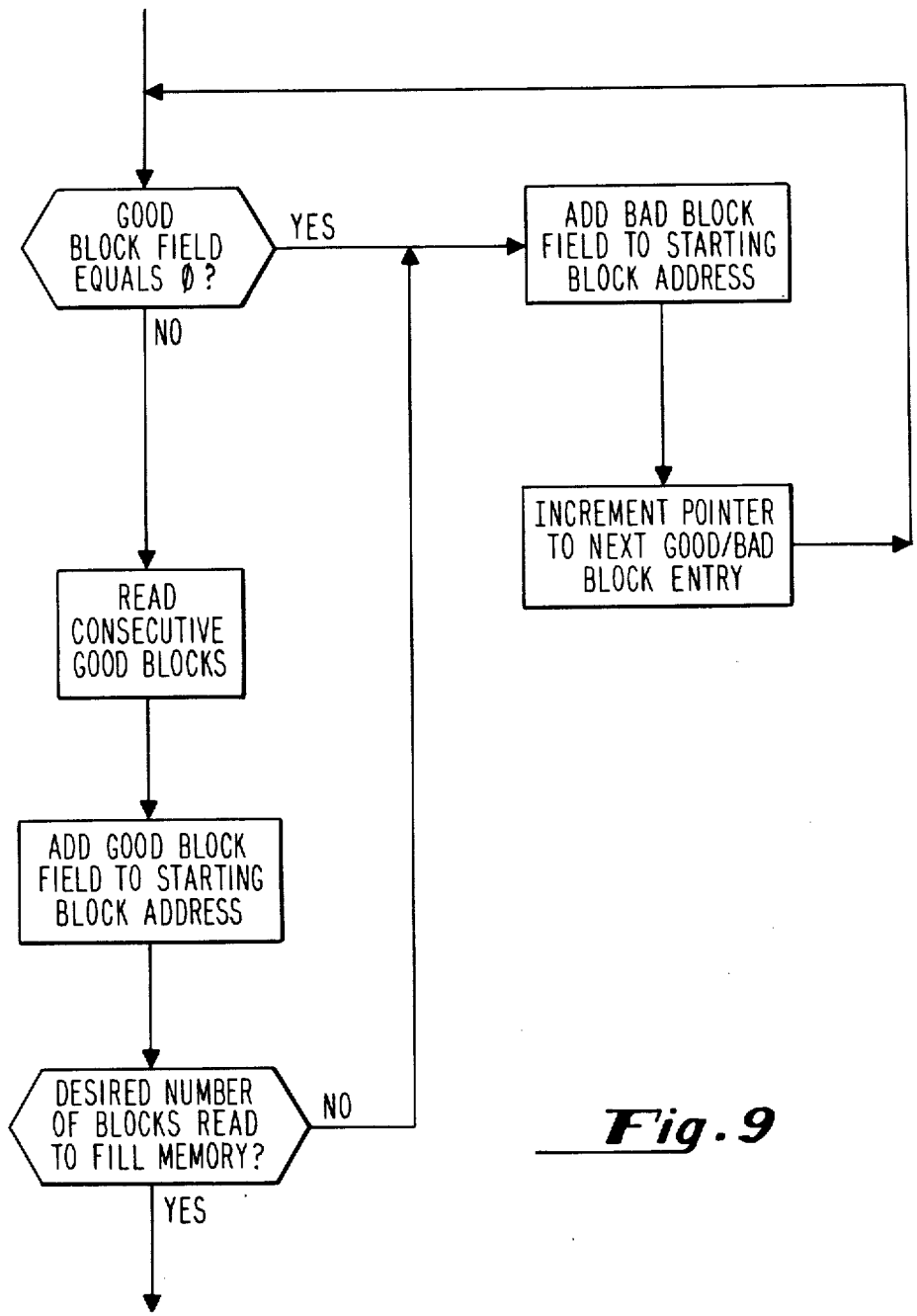
FIG. 9 depicts a flowchart of the software which is used to interpret the fragmentation map during disk readout.

The implementation of the box A of FIG. 8 is accomplished pursuant to the flow chart of FIG. 9. The flow chart of FIG. 9 represents how program coding is generated to implement the block called a "Fill Buffer Memory with Portion of Data Segment Using Bad Block Map Information".

It should be understood that modifications to the above described preferred embodiment of the invention may be made without departing from the spirit and scope thereof, as will be apparent to those skilled in the art.

What is claimed is:

1. A system for storing data from a plurality of variable-length records on an optical disk, comprising:
    first means for recording a plurality of variable-length data segments on said disk, each segment comprising up to a predetermined number of said records;
    second means for generating an embedded directory for each segment, each embedded directory comprising a number of entries, each corresponding to one of said plurality of records recorded as a segment;
    third means for recording on said disk said embedded directory in close physical association with the corresponding segment containing the records, and
    fourth means for recording a high level directory on said disk containing the physical location of each of said embedded directories.

2. The system according to claim 1 in which said second means also generates a fragmentation map and in which said third means also records on said disk said fragmentation map in close physical association to said embodded directory.

3. An optical disk for storage of information comprising a plurality of tracks, said information including:
    a plurality of variable-length records recorded as data segments on said disk;
    an embedded directory recorded on said disk in association with each of said plurality of record data segments and containing information relating to the records of the segments and in close proximity thereto, and
    a higher-level directory recorded at a predetermined location on said disk containing the addresses of each of the embedded directories recorded on said disk.

4. A system for storing data from a plurality of variable-length records on an optical disk, comprising:
    first means for recording a plurality of variable-length records on said disk in segments, second means for generating an embedded directory relating to each of the recorded records of said segments and then recording each embedded directory at location on said disk which are not predetermined and which are in physical association with each segment, and memory means for storing a high-level directory at a predetermined location on said disk containing the addresses of each of said embedded directories.

5. An optical disk having information stored thereon, said information including a high-level directory, a plurality of spaced apart embedded directories, and one or more data segments containing data positioned in close proximity to and in association with a corresponding one of said embedded directories, wherein the high-level directory contains address information to enable direction of a read/write head association with the disk to a particular embedded directory, and the embedded directory provides information to enable the read/write head to access variable-length data records stored in its associated data segment.

6. Method of emulating a magnetic tape drive using an optical disk storage system by responding to commands from a host computer to store and reproduce data stored on such a tape, comprising the following steps, performed in a write mode:
   receiving data records of varying length from a host computer,
   writing a predetermined number of records to an optical disk without non-data separators between successive records, while counting the number of bytes written as part of each record,
   after said predetermined number of records have been written, writing an embedded directory to said disk in physical proximity to said predetermined number of records, said embedded directory including a byte count indicating the number of bytes of each record so recorded, and
   writing a high-level directory to the disk indicating the location of each of said embedded directories on the disk.

7. The method of claim 6, wherein said high-level directory includes a correlation of an identification of a file comprising a number of records to at least the first embedded directory corresponding to the records recorded with respect to the file.

8. The method of claim 6, wherein the location at which the embedded directory is written to the disk is determined responsive to the lengths of the records corresponding thereto.

9. The method of claim 8, wherein said embedded directory is written to said optical disk immediately following the corresponding data records.

10. The method of claim 6, comprising the following further steps, performed in the read mode:
    responding to a command of the host to mount a tape by accessing the high-level directory to locate the embedded directory corresponding to the first record to have been stored on the tape, and
    counting numbers of bytes starting from the embedded directory, corresponding to the lengths of records requested to be counted by the host from the first record on the tape.

11. The method of claim 6, wherein said host orders a non-data file mark identifier to be written to the tape at undefined intervals between ones of said records, and wherein an indication of a record containing zero bytes is placed in the corresponding embedded directory in a position corresponding to the location for said file mark identifier ordered by said host.

12. The method of claim 11, wherein if said host commands said drive to count file mark identifiers in the read mode, said drive responds by sequentially examining the record lengths stored as part of the embedded directories in order to detect said zero record lengths, and thus detects locations between records corresponding to the positions of the file mark identifiers ordered to be written by the host.

13. A method of efficiently storing data records of indeterminate length, said records organized as files comprising an indeterminate number of said records, on an optical disk storage device, said disk being organized into data storage sectors of fixed length, said disk being only accessible at the beginning of said sectors, comprising the steps of:
    writing a predeteremined number of said records sequentially to an optical disk for storage, while maintaining a list recording the length of each record so written;
    when said predetermined number of records has been written to said disk, storing said list as an embedded directory, corresponding to said records, at a location on said disk which is not predetermined, and is in close proximity to the corresponding records; and
    storing the location of said embedded directory in a high-level directory at a predetermined location on said disk.

14. The method of claim 13, wherein all of the records as to which record length data is stored by a particular embedded directory are portions of a single data file.

15. The method of claim 13, wherein said high-level directory contains information relating all of the embedded directories storing record length data corresponding to records of a particular file to said file.

16. A method for retrieving data stored in accordance with the method of claim 13, comprising the steps of:
    responding to a request for retrieval of a record by a host by reading a quantity of data including said record into a random-access memory; and
    supplying said host with the requested record by employing the record length data stored to determine the actual location of the record requested by the host with respect to a known starting address on the disk.

17. The method of claim 16, wherein the known starting address on the disk is the beginning of a sector on said disk, and said stored record length data is employed by adding the record lengths stored in the embedded directory corresponding to records stored previous to said requested record.

18. Apparatus for storing records of varying length on an optical recording disk addressable only at predetermined positions thereon, comprising:
    means for writing said data records onto said disk, and for maintaining a list of their relative lengths;
    means for writing one or more of said lists to said disk as embedded directories, at locations determined in accordance with the lengths of the records to stored and in physical association therewith; and
    means for writing a high-level directory to said disk at a predetermined location, relating the locations of said embedded directories to said predetermined positions at which said disk is addressable.

19. The apparatus of claim 18, wherein said embedded directories are written to said disk immediately following the corresponding data records.

20. The apparatus of claim 18, further comprising means for responding to a command received from a host computer to write a file mark to a tape record emulated by said disk by writing a zero record length entry to said list.

21. The apparatus of claim 20, in combination with means for accessing said data stored on said disk by employing data stored in said high-level directory to locate the appropriate embedded directory, and subsequently employing the record-length data stored in said embedded directory to locate specific records stored on said disk.

* * * * *